United States Patent
Rodriguez et al.

(10) Patent No.: US 7,650,388 B2
(45) Date of Patent: Jan. 19, 2010

(54) WIRELESS IDENTIFICATION PROTOCOL WITH CONFIRMATION OF SUCCESSFUL TRANSMISSION

(75) Inventors: Alberto Rodriguez, Webster, NY (US); Heiko Rommelmann, Penfield, NY (US); Ron Boucher, Rochester, NY (US); Scott J. Bell, Rochester, NY (US); Will Phipps, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 1115 days.

(21) Appl. No.: 11/034,248

(22) Filed: Jan. 13, 2005

(65) Prior Publication Data

US 2006/0179391 A1    Aug. 10, 2006

(51) Int. Cl.
  *G06F 15/167* (2006.01)
  *G06F 15/173* (2006.01)
  *G06F 15/16* (2006.01)
(52) U.S. Cl. .............. 709/216; 709/232; 709/223; 709/224; 709/213; 709/214
(58) Field of Classification Search ............ 709/213, 709/214, 216, 223–224, 232
See application file for complete search history.

(56) References Cited

U.S. PATENT DOCUMENTS

| | | | |
|---|---|---|---|
| 6,256,665 B1 * | 7/2001 | Fry et al. .................. 709/208 |
| 6,418,283 B1 * | 7/2002 | Wegman et al. ............ 399/106 |
| 6,473,571 B1 * | 10/2002 | Wegman et al. ............. 399/12 |
| 6,532,351 B2 * | 3/2003 | Richards et al. ............ 399/111 |
| 6,865,349 B2 * | 3/2005 | Silence et al. ................ 399/8 |
| 6,940,613 B1 * | 9/2005 | Beard et al. ............... 358/1.13 |
| 7,227,939 B2 * | 6/2007 | Freemon et al. ........ 379/210.01 |
| 2003/0052161 A1 | 3/2003 | Rakers et al. |
| 2003/0215245 A1 * | 11/2003 | Silence et al. ................ 399/8 |
| 2004/0090647 A1 * | 5/2004 | Beard et al. ............... 358/1.14 |

FOREIGN PATENT DOCUMENTS

EP    0 689 151 A2    4/1995

* cited by examiner

*Primary Examiner*—Vivek Srivastava
*Assistant Examiner*—Thomas Duong
(74) *Attorney, Agent, or Firm*—Oliff & Berridge, PLC

(57) ABSTRACT

Systems and methods provide an acknowledgement protocol on completion of data transmission. A coupler board of a wireless identification system interfaces between a host processor of the wireless identification system and a replaceable unit monitor. The coupler board transmits data to the replaceable unit monitor. The replaceable unit monitor transmits an acknowledgement signal to the coupler board to indicate successful completion of the data transmission.

27 Claims, 7 Drawing Sheets

WIRELESS IDENTIFICATION PROTOCOL WITH CONFIRMATION OF SUCCESSFUL TRANSMISSION

Co-pending applications with application Ser. Nos. 11/012,478, 11/034,249, 11/013,798, 11/012,480, 10/978,423, 11/012,479, 11/034,058 and 11/013,703 are incorporated herein in their entirety by reference thereto.

BACKGROUND

A replaceable unit monitor (RUM), such as a customer replaceable unit monitor (CRUM) or an engineer replaceable unit monitor (ERUM), is used to monitor the status of a replaceable unit (RU), such as a toner cartridge, or the like. For example, a CRUM reader accesses a CRUM and obtains information regarding the status of a customer replaceable unit (CRU).

A CRUM reader system may include a host processor and a coupler board that interfaces between the host processor and a CRUM, such as a radio frequency identification (RFID) tag. Radio frequency identification (RFID) technology provides mechanisms for validation of data integrity during data exchanges, such as cyclic redundancy check (CRC) values, between a coupler board and a tag.

SUMMARY

Conventionally, RFID technology does not provide an indication to a host as to whether a write cycle was successful or not. Thus, when a coupler board sends a write command to a tag, the operation is blind in nature. The only way to verify success during a write operation is for the host to read back the memory location that was previously addressed for write and compare the read value against the value that was sent for storage initially.

The reading back and comparing the read value requires additional processing time and code-design complicity on the host side. Also, for every write operation, a read has to be performed for validating the data. Thus, the associated effective bus data rate is reduced to nearly half.

Systems and methods are provided for simple validation of a success of a write operation at the tag level by a host device.

Various exemplary embodiments provide an acknowledgement/non-acknowledgement signal, in the form of a binary code, from a tag to a coupler board to indicate the success or failure of a write operation. The coupler board stores the success or failure information in a status register of the coupler board which is available for interrogation by the host device.

Various exemplary embodiments provide the addition of an acknowledge (ACK) or no-acknowledge (NACK) signal transmission protocol between a replaceable unit monitor (RUM), such as a customer replaceable unit monitor (CRUM) and a coupler board. The ACK or NACK signal corresponds to a pre-established binary code that is interpreted by the coupler board as success or failure of the write cycle respectively. The protocol may be implemented as firmware or hardware in the coupler board and the replaceable unit monitor (RUM).

Various exemplary embodiments provide systems and methods for implementing a timer for causing a delay time. When an ACK or NACK signal is not received during the delay time, a no response indication is automatically established by the coupler board.

Various exemplary embodiments provide systems and methods for a replaceable unit monitor (RUM) to use a cyclic redundancy check (CRC) value for providing validation of the ACK or NACK code transmission.

In various exemplary embodiments, the systems and methods allow a coupler board to wait for an acknowledgement or no acknowledgement signal and its corresponding CRC from a replaceable unit monitor (RUM) after sending data to the replaceable unit monitor (RUM). The coupler board updates its internal register to indicate a successful transmission of the data to the replaceable unit monitor (RUM) after receiving the acknowledgement signal from the replaceable unit monitor (RUM). When a no acknowledgement signal is received the coupler board updates its internal register to indicate a failed transmission. If the coupler board does not receive a signal from the RUM within the delay time a no response event is recorded in its internal register. The internal register of the coupler board is accessible by a host device.

These and other features and details are described in, or are apparent from, the following detailed description.

BRIEF DESCRIPTION OF THE DRAWINGS

Various exemplary details of systems and methods are described, with reference to the following figures, wherein.

DETAILED DESCRIPTION OF EMBODIMENTS

Various exemplary embodiments provide the addition of an acknowledge or no acknowledge signal transmission protocol between a replaceable unit monitor (RUM) and a coupler board. The acknowledgement (ACK) may confirm that a write transmission is successful. The no-acknowledgement (NACK) indicates a failed write cycle. When an ACK or NACK signal is not received during the delay time, a no response indication is automatically established to indicate a failure.

The following description is based on a CRUM reader system as an example. It should be appreciated that the description applies to engineer replaceable unit monitor (ERUM) reader systems and, in general, to replaceable unit monitor (RUM) reader systems.

Figure 1:
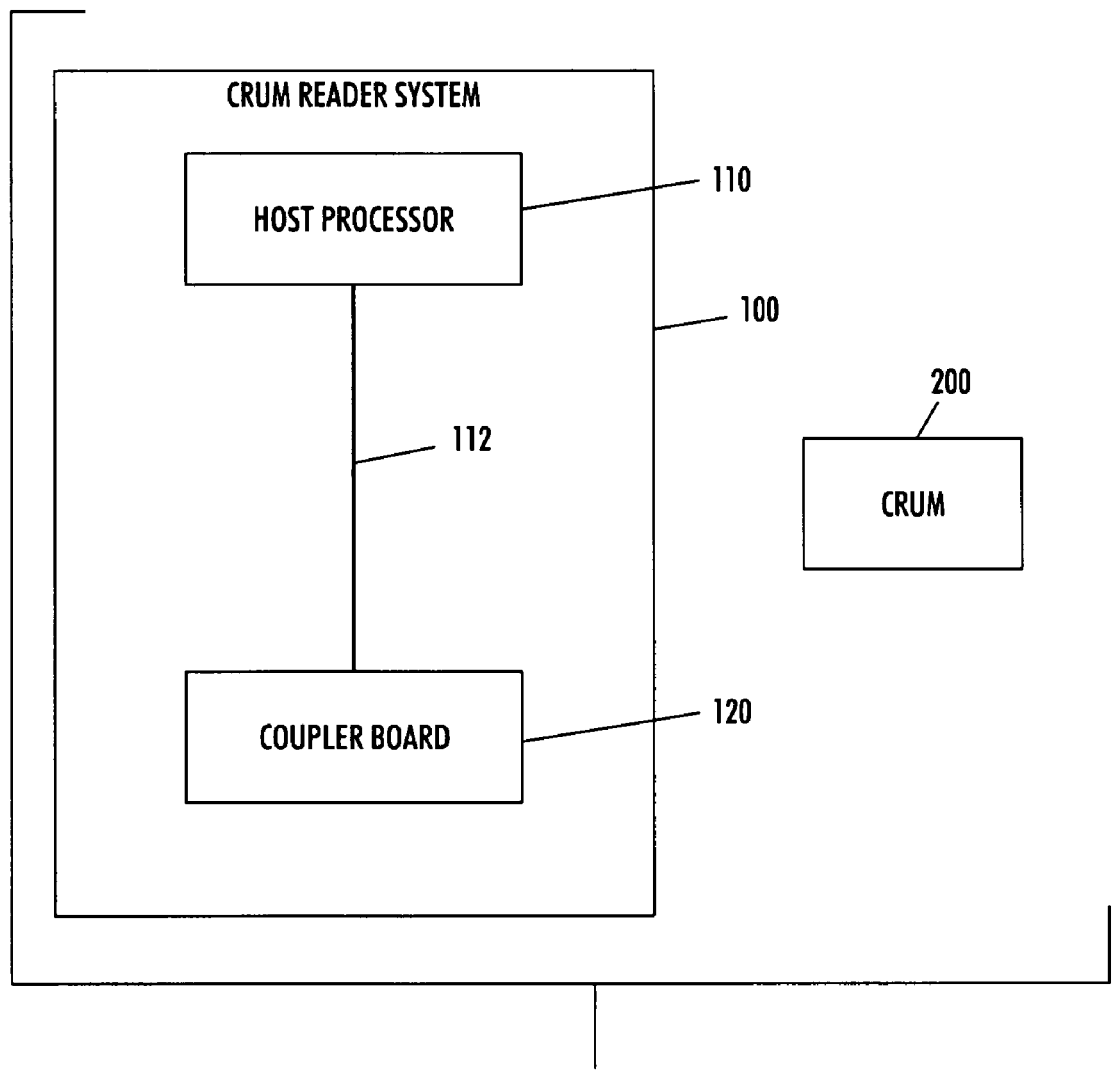
FIG. 1 illustrates a conventional RF CRUM/coupler/host system.

FIG. 1 illustrates a conventional RF CRUM/coupler/host system. As shown in FIG. 1, a CRUM reader system 100 includes a host processor 110 and a coupler board (also referred to as coupler circuitry or coupler chip) 120, interconnected by data/control bus 112. The CRUM reader system 100 accesses a CRUM 200.

The CRUM 200 may be a memory module that is attached to a customer replaceable unit (CRU) of a machine. The memory module may be programmed with specific information during manufacturing. Some of that information may be updated when the CRUM is inserted in a machine, such as a printer or copier. Some of the information may also be transferred to the machine. The machine makes decisions based on the information.

The CRUM 200 may also be a wire chip assembly, a PC board, or the like. For example, the CRUM may be a radio frequency identification (RFID) tag. The RFID tag may include an integrated circuit (IC) memory chip connected to an antenna. The tag may receive power and/or data signal via a radio frequency (RF) signal that is generated by the coupler board 120. The tag communicates with the coupler board 120 by, for example, changing the characteristic impedance of its antenna in a way that is detectable by the coupler board 120. This is known as "loading effect" or "back-scattering".

The coupler board 120 is an interface between the host processor 110 and the CRUM 200. The coupler board may include an integrated circuit chip, associated circuitry (not shown) and an antenna. The coupler board 120 generates a signal, such as a modulated radio frequency signal, and detects loading effects of the CRUM 200.

The host processor 110 may transmit data to the CRUM 200 via the coupler board. The host processor 110 preferably uses a predetermined command set to communicate with the coupler board. The command set may include commands such as Read, Write, etc. A Read command instructs the coupler board to communicate with the tag and request the memory contents of a specific memory location to be transmitted back. The address of the memory location to be read are part of the command sequence. A Write command instructs the coupler board to transmit to the tag specific data to be stored in a specific memory location in the tag. The data and memory location are part of the command sequence. The host processor 110 controls the coupler board 120 via data/control bus 112. The coupler board 120 may pass commands and data to the CRUM 200 using, for example, a modulated radio frequency carrier. A more detailed description of a CRUM system may be found in co-pending application Ser. No. 11/013,703, which is incorporated herein in its entirety by reference thereto.

Figure 2:
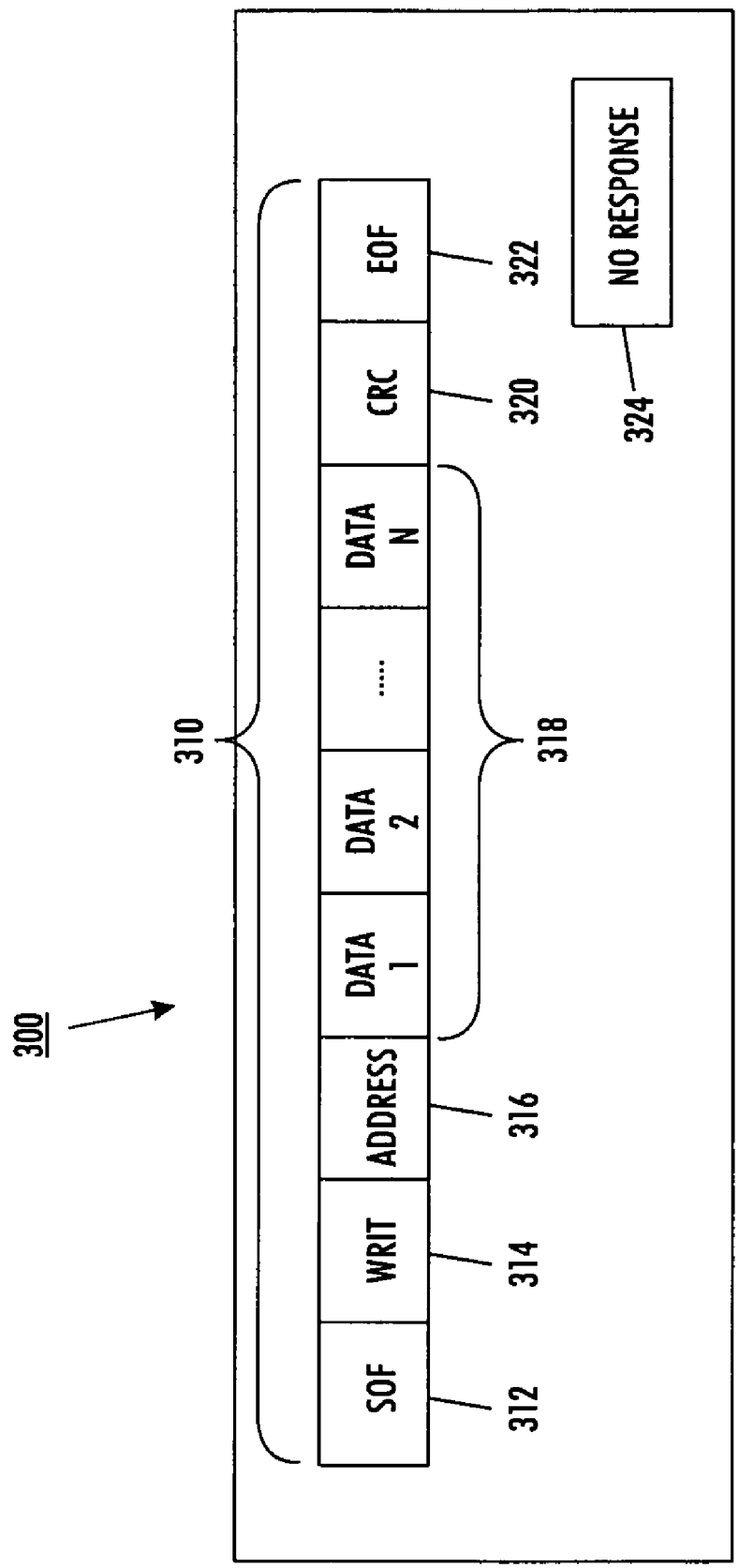
FIG. 2 illustrates a conventional communication sequence between a coupler board and a CRUM.
Figure 3:
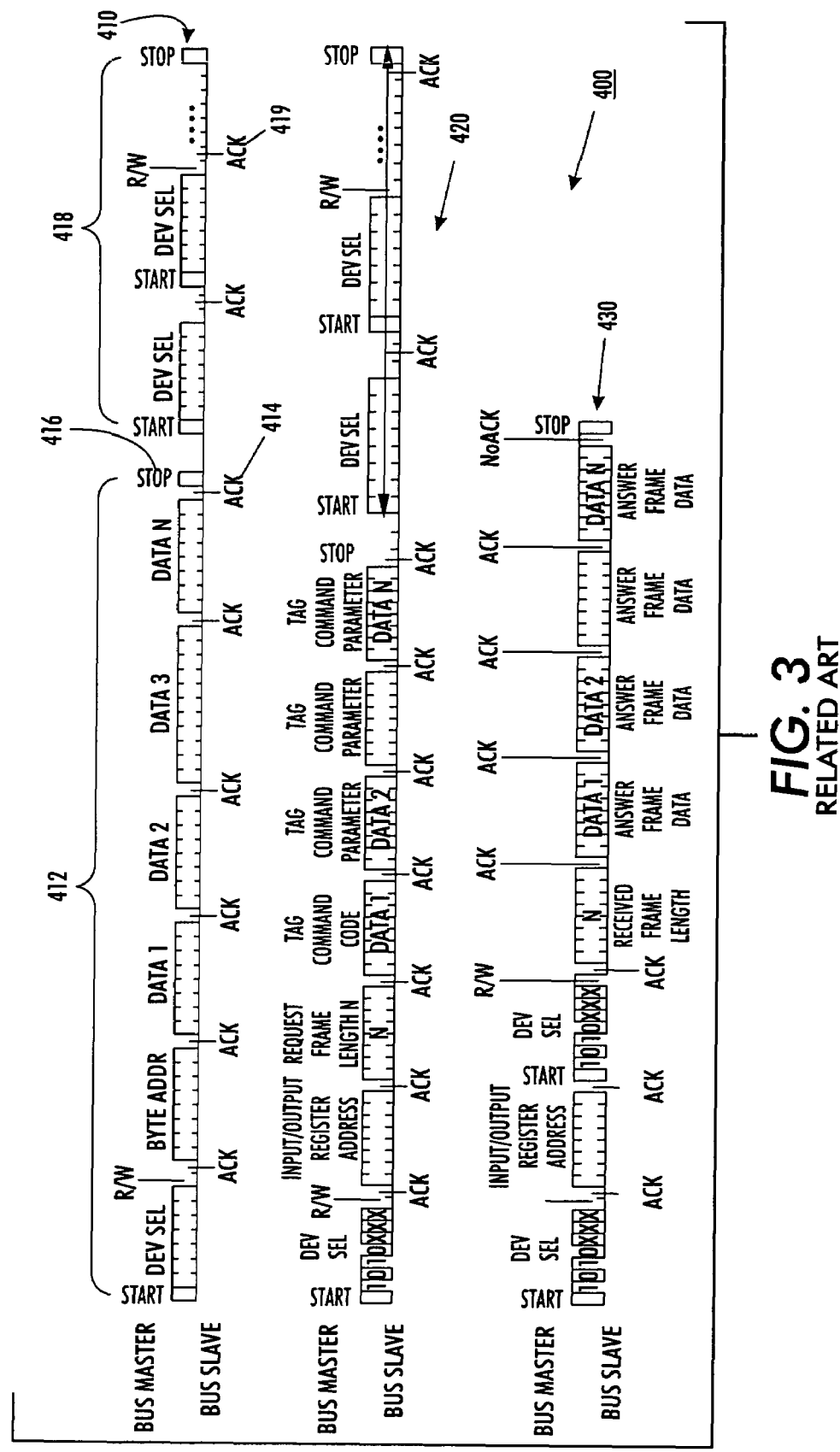
FIG. 3 illustrates a conventional communication sequence between a host device and a coupler board.

FIGS. 2 and 3 illustrate conventional communication sequences of a "blind" operation when the CRUM 200 in FIG. 1 does not send an ACK/NACK signal to the coupler board 120 to acknowledge completion or failure of a write cycle. In particular, FIG. 2 illustrates the communication sequence between the coupler board 120 and the CRUM 200. As shown in FIG. 2, the communication sequence 300 includes a communication frame 310 transmitted from the coupler board 120 to the CRUM 200. The communication frame may be a radio frequency frame that contains command 314, address 316, data 318, cyclic redundancy check (CRC) values 320, and a start of frame (SOF) bit 312 and an end of frame (EOF) bit 322 for synchronization purposes.

In FIG. 2, numeral 324 indicates that there is no response from the CRUM 200 back to the coupler board 120 regarding the success or failure of the completion of the write cycle. Thus, the write operation is a "blind" operation.

FIG. 3 illustrates a communication sequence between the host processor 110 and the coupler board 120. When the data/control bus 112 is an inter-integrated circuit ($I^2C$) bus, the host coupler 110 is the bus master, and the coupler board 120 is the bus slave.

As shown in FIG. 3, the communication sequence 400 may include a write request transmission portion 410 from the host to the coupler board, a read request portion 420, from the host to the coupler board, and a data read portion 430, where the host reads from the coupler board the tag data requested during the read request portion 420.

In a standard EEPROM $I^2C$ device, communication occurs between the host device (master device) and memory device (slave device) directly. The slave device issues an acknowledgement for each data byte that arrives. The data is latched in the memory device input registers. Once the communication session ends, data is transferred from the input register to internal memory. Because data transfer at this point is internal to the memory device, it is safe to assume that, if all data bytes were acknowledged, the write cycle completed successfully.

In the case of wireless technology, communication between a host device and a memory device, such as an RFID tag, is indirect. With an RFID tag, communication between the host device and the tag occurs first from the host device, such as a computer, to the coupler board. Then, the coupler board, which handles low level communication with the tag, passes the communication to the tag via wireless signal, such as a radio frequency signal. In the example shown in FIG. 2, the radio frequency frame is accompanied by a corresponding CRC value 320.

As illustrated in FIG. 3, the write request portion 410 from the host processor 110 to the tag starts by a first communication sequence 412 between the host processor 110 and the coupler board 120. Data values and commands are latched by internal registers of the coupler board 120. An ACK signal 414 for each command and data byte indicates to the host processor 110 that the information was properly received by the coupler board 120. The stop condition 416 at the end of the transaction triggers the coupler board 120 to initiate radio frequency communications with the CRUM 200. During this time the coupler board is not available to the $I^2C$ bus and the host enters a polling sequence 418 to monitor when the coupler board becomes available to the $I^2C$ bus. When the radio frequency communications are concluded the coupler board becomes available to the $I^2C$ bus.

In a blind operation, the only response back to the host processor 110 is from the coupler board 120 in the form of a single bit ACK signal 419 to indicate that the coupler board 120 was capable of completing the radio frequency transmission to the CRUM 200, such as an RF tag. It may happen that the radio frequency frame is corrupted. For example, in noisy environments due to electromagnetic interference (EMI), the data and its corresponding CRC value may be altered so that they do not match and therefore the internal write cycle of the tag is never triggered. In these circumstances, the data may never be saved. Nonetheless, because this is a blind operation, the corruption of the radio frequency frame may not be known to the host processor 110 or the coupler board 120. The only way to find out if the transmitted data was saved in the RUM is to read back the memory contents with a read-request sequence 420. After the data has been received from the tag the host proceeds to read the data stored in the coupler board registers during the read sequence 430. After obtaining the data from the coupler board the host proceeds to compare the actual memory contents to the intended memory contents to determine if they match.

A read-back validation of the memory contents adds complexity to the host processor's firmware design. Additionally, the read-back validation ties up the data/control bus 112, effectively reducing its rate capacity to nearly half. For example, in the read-back validation process, the host processor 110 enters an ACK polling routine to monitor when the coupler board 120 becomes available to the $I^2C$ line, increasing the traffic on the $I^2C$ line.

Figure 4:
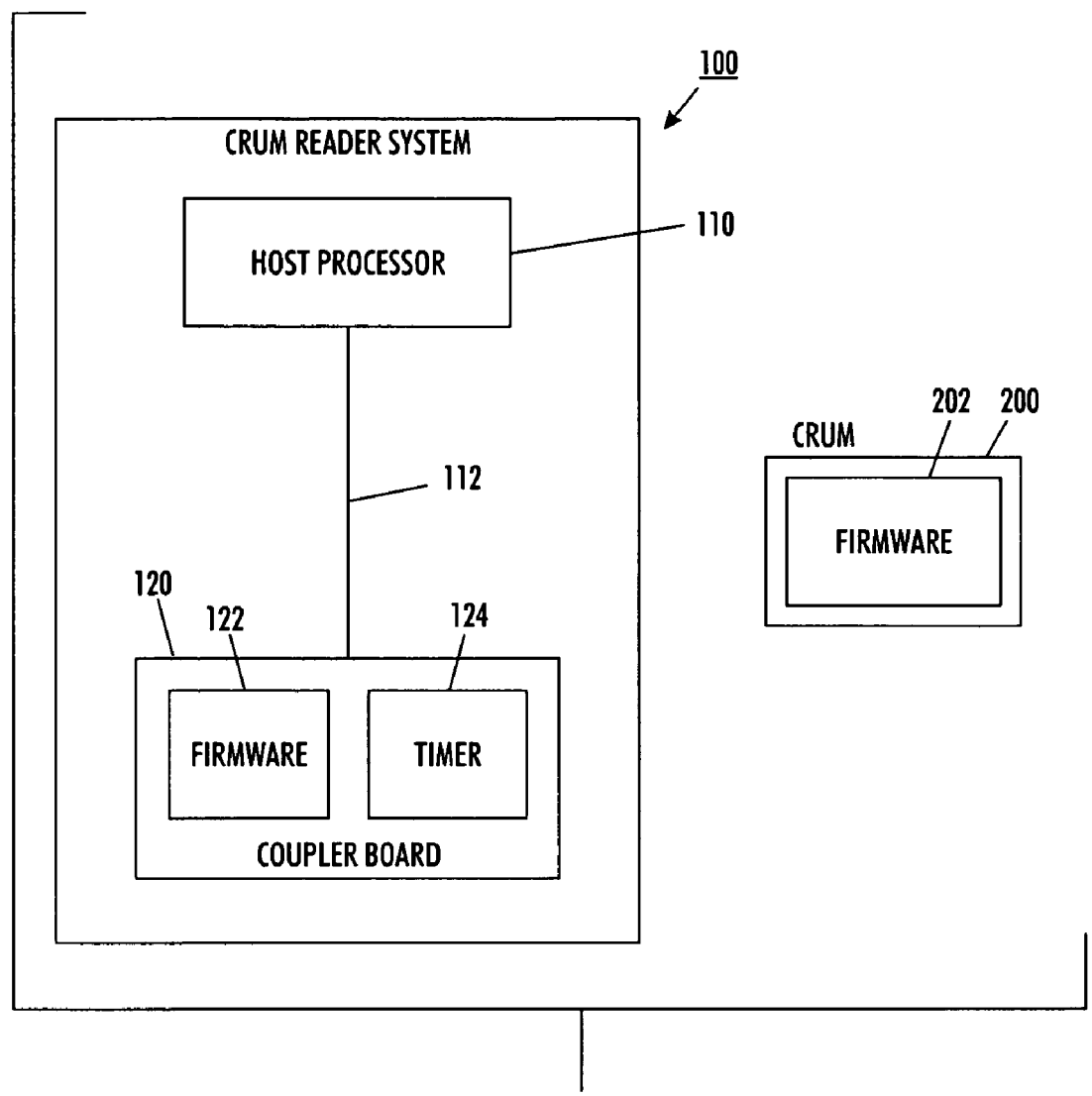
FIG. 4 illustrates an embodiment of an RF CRUM/coupler/host system with confirmation of successful/unsuccessful write command completion.

FIG. 4 illustrates an exemplary embodiment of a CRUM/coupler/host system having a protocol with an ACK code on proper completion of a write cycle or a NACK code when the write cycle fails. The system shown in FIG. 4 is similar to that shown in FIG. 1. Therefore, like elements are labeled with like numeral references, and their descriptions are omitted.

The system in FIG. 4 differs from that in FIG. 1, in that the system in FIG. 4 has the addition of an acknowledge (ACK) or no-acknowledge (NACK) signal transmission protocol between the coupler board 120 and the CRUM 200. The protocol may be implemented as firmware 122 on the coupler board 120 and firmware 202 on the CRUM 200. Alternatively, the protocol may be implemented as hardware (not shown), in place of the firmware 122, on the coupler board 120; and hardware (not shown), in place of the firmware 202, on the CRUM 200. The system in FIG. 4 also differs from FIG. 1, in that a timer 124, establishes a maximum amount of time during which the coupler board waits for a response from the tag in the form of an ACK or NACK. When this amount of time expires without the receipt of an ACK/NACK the coupler board establishes a no response condition, updates its status register accordingly and becomes available to the I²C bus.

The firmware 202 of the CRUM 200 allows the CRUM 200, after validating the integrity of the radio frequency frame contents with its corresponding CRC value, to generate an ACK/NACK response back to the coupler board 120 to indicate whether or not the write cycle completed successfully. The coupler board 120 stores a validation inside a status register in the coupler board 120. The status register is available for access to the host processor 110 via the data/control bus 112.

In various exemplary embodiments, the data/control bus 112 allows the host processor 110 to access the status register of the coupler board 120. For example, the data/control bus 112 may be an I²C bus. The data/control bus 112 may also be USB, SPI, etc.

In various exemplary embodiments, the CRUM reader system 100 accesses the CRUM 200 by, radio frequency (RF) communication. In the example shown in FIG. 4, radio frequency is used for the CRUM reader system 100 to access the CRUM 200.

In various exemplary embodiments, systems, such as the coupler/host system shown FIG. 4, may be included in a marking device, such as a digital photocopier, a xerographic marking device, an ink-jet printer, or the like. In various other exemplary embodiments, replaceable units, including the CRUM shown FIG. 4, may be installable in a marking device, such as a digital photocopier, a xerographic marking device, an ink-jet printer, or the like.

Figure 5:
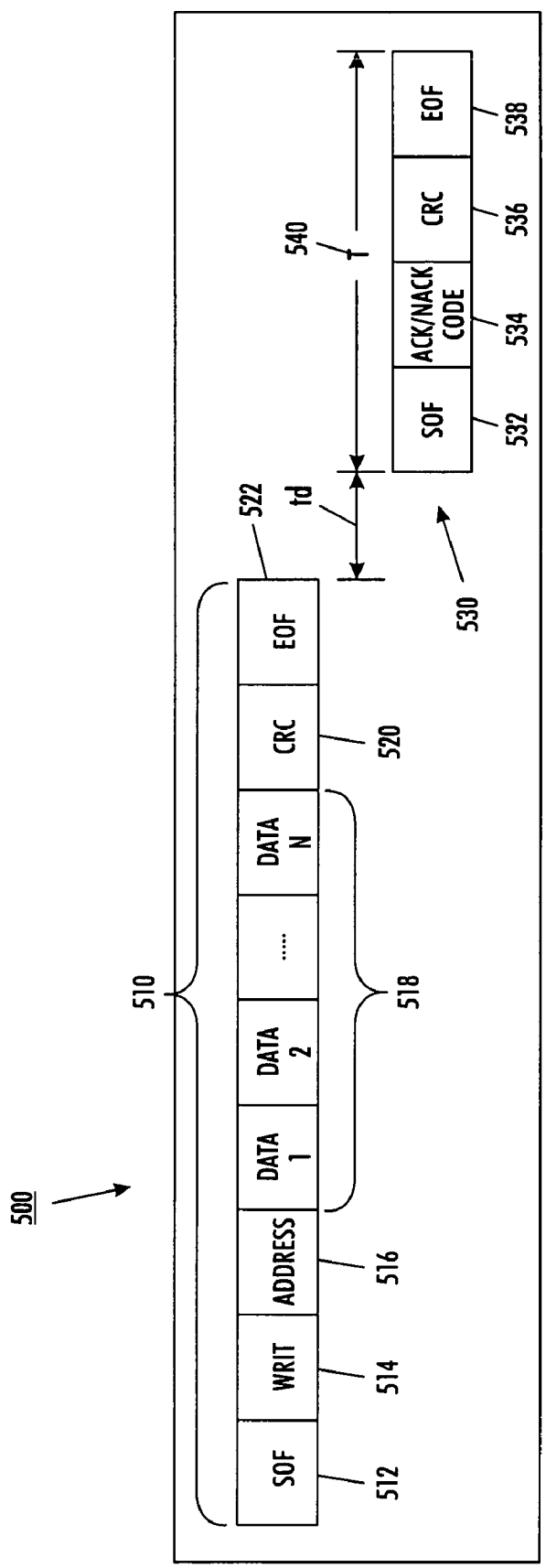
FIG. 5 illustrates an embodiment of a communication sequence between a coupler board and a tag with confirmation of successful/unsuccessful write command completion.
Figure 6:
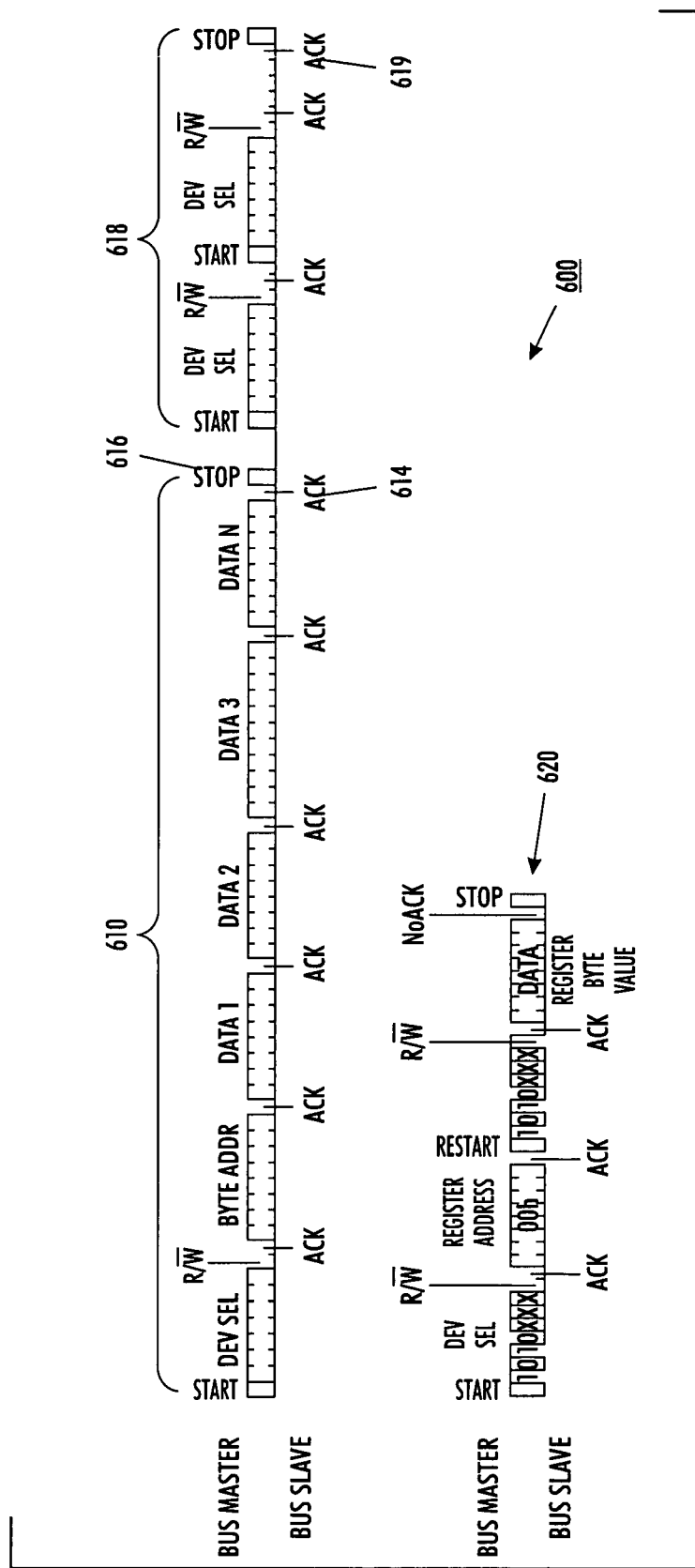
FIG. 6 illustrates an embodiment of a communication sequence between a host device and a coupler board with confirmation of successful/unsuccessful write command completion.

FIGS. 5 and 6 illustrate an exemplary embodiment of communication sequences. In particular, FIG. 5 illustrates an exemplary embodiment of a communication sequence between the coupler board 120 and the CRUM 200 of FIG. 4. In FIG. 5, it is assumed that the CRUM 200 is a radio frequency identification tag. The coupler board 120 transmits a radio frequency frame 510 to the RFID tag. The RF frame 510 is similar to the RF frame 310 in FIG. 2. In particular, the RF frame 510 contains command 514, address 516, data 518, CRC 520, and start of frame (SOF) bit 512 and an end of frame (EOF) bit 522 for synchronization purposes.

The communication sequence of FIG. 5 is different from that of FIG. 2 in that the communication sequence of FIG. 5 contains an ACK/NACK response 534 from the tag to the coupler board. As shown in FIG. 5, the ACK/NACK response 534 may contain start of frame (SOF) bit 532, CRC 536, ACK/NACK code 534, and an end of frame (EOF) bit 538 for synchronization purposes. The ACK/NACK code 534 provides an ACK/NACK signal. Numeral 540 depicts the typical amount of time it takes a tag to complete the ACK/NACK communications frame.

The tag will validate the received data against its CRC values and store it in its internal memory. As shown in FIG. 5, an ACK from the tag to the coupler board 120 is generated when the write cycle completes successfully. In the event that the received data and its CRC value do not validate, a NACK code is generated to indicate a failed write cycle. Generation of the ACK/NACK signal, which consists of a binary code, is necessary to close the radio frequency (RF) transaction successfully.

The tag may return the ACK/NACK code 534 as soon as it finishes validating the received data against its CRC value, so as to reduce response time. Such an approach may be practical when, for example, there is little chance of a problem occurring during the transfer of data from the input registers to the internal memory of the tag.

As shown in FIG. 4, the coupler board 120 may include a timer 124. The timer 124 assumes a no response (time out) after an amount of time $t_r$ has elapsed without receiving an ACK/NACK from the tag during a write sequence. This amount of time may, for example, be based on the typical response time of the tag.

As shown in FIG. 5, a delay time $t_d$ (measured by the timer 124) allows the coupler board 120 enough time to switch from a transmitter mode to a receiver mode in order to listen for a response from the tag. When an ACK/NACK from the tag is detected by the coupler board 120, a status register value may be changed to indicate that the write cycle was successful or unsuccessful respectively.

On the other hand, if no ACK/NACK is received from the tag during the typical response time of a tag $t_r$, a no response condition is established and the status register value is changed accordingly. In the event that the ACK/NACK code do not validate against its CRC value a transmission error is established and the corresponding status register value is changed to indicate that a CRC error has occurred. The register values are preferably reset to default values prior to the start of a radio frequency write transmission.

After completion of the communication sequence shown in FIG. 5, the coupler board 120 becomes available to the I²C bus and may wait for the host processor 110 to poll, and then respond to the host processor 110 if addressed.

For example, during the radio frequency transmission, the host processor 110 enters a polling mode, and waits for the coupler board 120 to confirm completion of the write cycle. When the coupler board 120 generates an ACK to indicate that the radio frequency transmission is finished and the coupler board 120 is listening to the I²C commands from the host processor 110, the host processor 110 proceeds to read the status register of the coupler board 120 to determine whether the write command was successful or not. Alternatively, the coupler board 120 may, without being first instructed by the host processor 110, send a signal, such as an interrupt signal, to the host processor 110, indicating successful completion of the transmission. If the interrupt signal is not received by the host processor within a specified amount of time the write operation is assumed unsuccessful.

FIG. 6 illustrates an exemplary communication sequence between the host processor 110 and the coupler board 120. As shown in FIG. 6, the communication sequence 600 includes a write cycle 610, a polling sequence 618 and a read cycle 620. The write cycle 610 is similar to the write cycle 410 in FIG. 3. The host processor 110 transmits commands and data to the coupler board 120. The coupler board 120 sends an ACK 614 to indicate completion of the transmission from the host processor 110 to the coupler board 120. A stop condition 616 at the end of the transmission triggers the coupler board 120 to initiate radio frequency communication. During the radio frequency communication, the host processor 110 enters a polling sequence 618 to detect whether the coupler board 120 is currently available via the data/control bus 112.

As shown in FIG. 6, the communication sequence 600 also includes a read cycle 620. Once the coupler board 120 is available for communication, the host processor 110 reads the status register of the coupler board 120 to determine whether the write command was successfully executed or not.

A comparison between FIGS. 3 and 6 indicates that the communication sequence of FIG. 6 is simpler and shorter. The radio frequency communication to read back the data from the tag (the read-back communication 420 in FIG. 3) is not needed in FIG. 6. Also, in FIG. 6, the host processor 110 merely reads the status register of the coupler board 120, instead of reading all memory locations previously written to and comparing read contents against intended contents. Also, at his point the communication is between the host processor 110 and the coupler board 120. No radio frequency transmission takes place. Thus, the communication time in FIG. 6 is significantly reduced. It is estimated that the communication time in FIG. 6 may be reduced from that in FIG. 3 by at least 50 percent.

Figure 7:
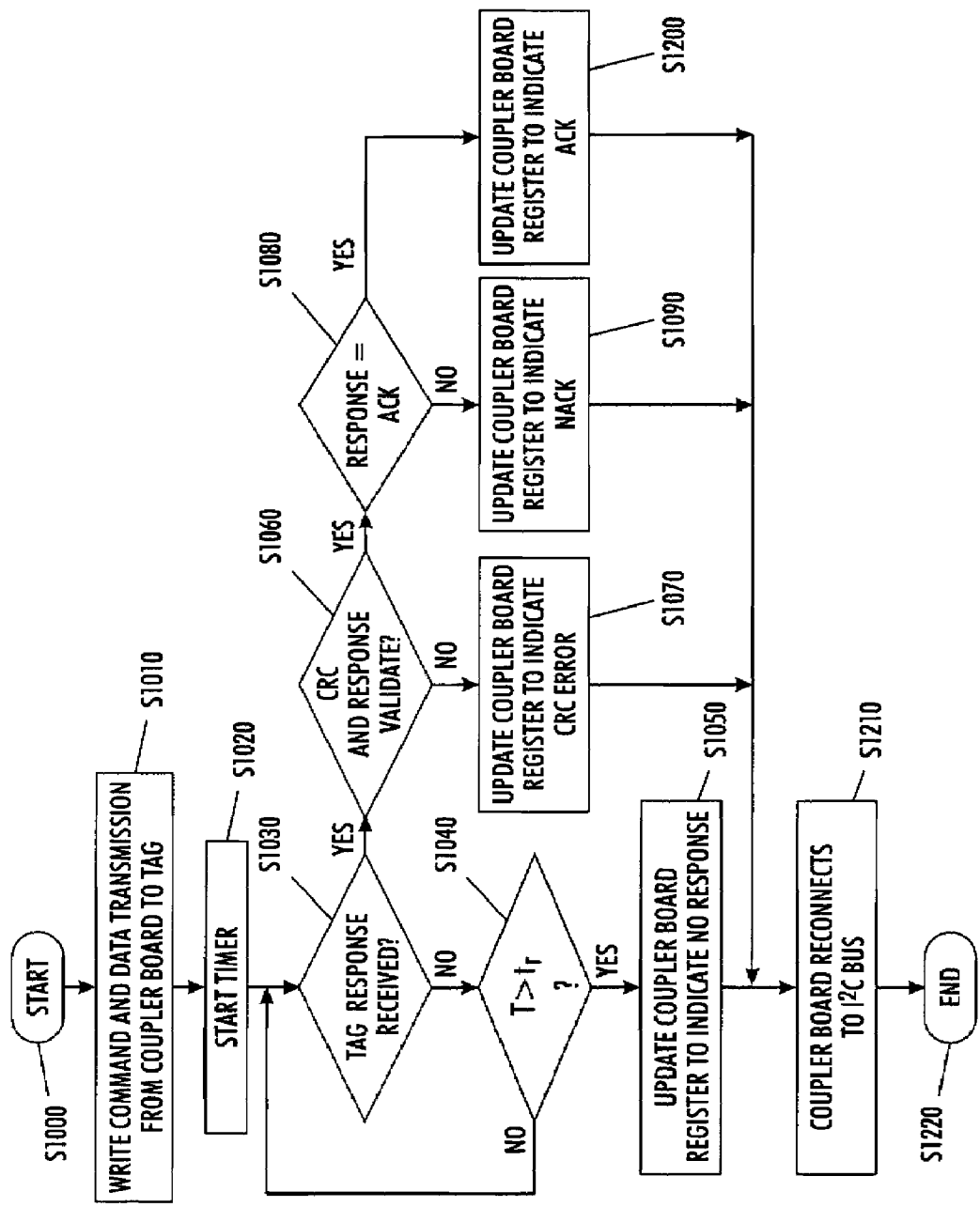
FIG. 7 illustrates a flowchart outlining an embodiment of a method for confirming write command completion.

FIG. 7 is a flowchart outlining an exemplary embodiment of a method for receiving an acknowledgement, such as an ACK, from a replaceable unit monitor (RUM), such as a RFID tag. As shown in FIG. 7, beginning in step S1000, operation of the method proceeds to step S1010, where command and data are transmitted from a coupler board to a tag. Next, in step S1020, a timer is started to measure time T 540.

Then, in step S1030, a determination is made whether a tag response has been received from the replaceable unit monitor. If it is determined in step S1030 that a tag response has been received from the replaceable unit monitor, operation jumps to step S1060. On the other hand, if it is determined at step S1030 that a tag response has not been received from the replaceable unit monitor, operation proceeds to step S1040.

At step S1040, a determination is made whether the measured time T is greater than a predetermined time $t_r$. If it is determined at step S1040 that the measured time T is not greater than the predetermined time $t_r$, operation jumps back to step S1030, where operation continues determining whether a tag response has been received from the replaceable unit monitor. On the other hand, if it is determined at step S1040 that the measured time T is greater than the predetermined time $t_r$, operation proceeds to step S1050, where the coupler board register is updated to indicate no response. Operation then continues to step S1210 where the coupler board becomes available to the I²C bus. Thereafter, operation continues to step S1220, where operation of the method returns.

Alternatively, at step S1060, a determination is made whether CRC and the received response validate. If it is determined at step S1060 that CRC and the received response do not validate, operation proceeds to step S1070 where the coupler board register is updated to indicate CRC error. Operation then continues to step S1210 where the coupler board becomes available to the I²C bus. Thereafter, operation continues to step S1220, where operation of the method returns. On the other hand, if it is determined at step S1060 that CRC and the received response validate, operation jumps to step S1080.

At step S1080, a determination is made whether the received response is an ACK. If it is determined at step S1080 that the received response is not an ACK, operation proceeds to step S1090 where the coupler board register is updated to indicate NACK. Operation then continues to step S1210 where the coupler board becomes available to the I²C bus. Thereafter, operation continues to step S1220, where operation of the method returns. On the other hand, if it is determined at step S1080 that the received response is an ACK, operation proceeds to step S1200 where the coupler board register is updated to indicate ACK. Operation then continues to step S1210 where the coupler board becomes available to the I²C bus. Thereafter, operation continues to step S1220, where operation of the method returns.

The method illustrated in FIG. 7 may be implemented in a computer program product that can be executed on a computer. The computer program product may be a computer-readable recording medium on which a control program is recorded, or it may be a transmittable carrier wave in which the control program is embodied as a data signal.

While various details have been described, these details should be viewed as illustrative, and not limiting. Various modifications, substitutes, improvements or the like may be implemented within the spirit and scope of the foregoing disclosure.

What is claimed is:

1. A method of confirming completion of data transmission from a wireless identification system to a replaceable unit monitor, the wireless identification system including a host processor and a coupler board, the coupler board interfacing between the host processor and the replaceable unit monitor, the method comprising:

transmitting data from the coupler board to the replaceable unit monitor, wherein the replaceable unit monitor includes a radio frequency identification tag, and transmitting data from the coupler board to the radio frequency identification tag is via modulated radio frequency signal; and receiving at the coupler board a signal from the replaceable unit monitor affirmatively indicating the success or failure of the data transmission, the signal being an acknowledgement signal signifying success if the data transmission is completed successfully, and a no-acknowledgement signal signifying failure if the data transmission fails, the data transmission being a write cycle, wherein receiving acknowledgement signal or no-acknowledgement signal comprises establishing a no-response condition if no signal is received from the replaceable unit monitor within a predetermined amount of time and changing a value of a register in a memory of the coupler board from a default value to an updated value to indicate the no response condition, the register being accessible by the host processor; and the coupler board includes a timer and measure a delay time allowing the coupler board to switch from a transmitter mode to a receiver mode at least for the purpose of listening for a response from the radio frequency identification tag.

2. The method of claim 1, further comprising transmitting data from the host processor to the coupler board before the data is transmitted from the coupler board to the replaceable unit monitor.

3. The method of claim 2, wherein transmitting data comprises transmitting data from the host processor to the coupler board via a communication bus.

4. The method of claim 1, wherein:
the replaceable unit monitor is a radio frequency identification tag.

5. The method of claim 1, further comprising:
upon receiving an acknowledgement or no-acknowledgement signal, changing a value of a register in a memory of the coupler board from a default value to an updated value to indicate successful or unsuccessful completion of data transmission, the register being accessible by the host processor.

6. The method of claim 1, the acknowledgement or no-acknowledgement signal consisting of a binary code.

7. The method of claim 1, the replaceable unit monitor validating the data transmission with a cyclic redundancy check (CRC) value of a radio frequency communication sequence, the acknowledgement signal being received at the coupler board when the replaceable unit monitor validates the data transmission with the CRC value, the no-acknowledgement signal being received at the coupler board when the replaceable unit monitor does not validate the data transmission with the CRC value.

8. The method of claim 1, wherein receiving the acknowledgement or no-acknowledgement signal comprises receiving the acknowledgement or no-acknowledgement signal with a protocol implemented in firmware or hardware in the coupler board and firmware or hardware in the replaceable unit monitor.

9. The method of claim 1, wherein the acknowledgement (ACK) signal or no-acknowledgement (NACK) signal is validated against its CRC value, a CRC error condition is established if the ACK/NACK signal does not validate against its CRC, and a value of a register in a memory of the coupler board is changed from a default value to an updated value to indicate the CRC error condition, the register being accessible by the host processor.

10. The method of claim 1, further comprising:
changing from a transmitting mode to a receiving mode after transmitting the data; and changing from the receiving mode to the I²C mode after receiving the acknowledgement or no-acknowledgement signal.

11. A computer-readable recording medium on which a control program is recorded having computer-executable instructions for performing the method recited in claim 1.

12. A method of confirming completion of data transmission from a wireless identification system to a replaceable unit monitor, the wireless identification system including a host processor and a coupler board, the coupler board interfacing between the host processor and the replaceable unit monitor, the method comprising:
the replaceable unit monitor receiving data from the coupler board, wherein the replaceable unit monitor includes a radio frequency identification tag, and receiving data from the coupler board at the radio frequency identification tag is via modulated radio frequency signal; and
generating a signal from the replaceable unit monitor to the coupler board affirmatively indicating the success or failure of the receipt of data from the coupler board, the signal being an acknowledgement signal signifying success if a write cycle is completed successfully, and a no-acknowledgement signal signifying failure if the write cycle fails,
wherein receiving acknowledgement signal or no-acknowledgement signal comprises establishing a no-response condition if no signal is received from the replaceable unit monitor within a predetermined amount of time and changing a value of a register in a memory of the coupler board from a default value to an updated value to indicate the no response condition, the register being accessible by the host processor; and the coupler board includes a timer and measure a delay time allowing the coupler board to switch from a transmitter mode to a receiver mode at least for the purpose of listening for a response from the radio frequency identification tag.

13. The method of claim 12, wherein:
the replaceable unit monitor is a radio frequency identification tag.

14. The method of claim 12, the acknowledgement or no-acknowledgement signal being a binary code.

15. The method of claim 12, the further validating the data at the replaceable unit monitor with a cyclic redundancy check (CRC) value of a radio frequency communication sequence, the acknowledgement signal being generated by the replaceable unit monitor when the replaceable unit monitor validates the data wit the CRC value, the no-acknowledgement signal being generated by the replaceable unit monitor when the replaceable unit monitor does not validate the data with the CRC value.

16. The method of claim 12, wherein generating the acknowledgement or no-acknowledgement signal comprises generating the acknowledgement or no-acknowledgement signal with a protocol implemented in firmware or hardware in the coupler board and firmware or hardware in the replaceable unit monitor.

17. The method of claim 12, further comprising the coupler board changing from a transmitting mode to a receiving mode after transmitting the data; establishing receipt of a no-response condition if an acknowledgement or no-acknowledgment signal is not received from the replaceable unit monitor in a predetermined delay time; and changing from the receiving mode to the I²C mode after receiving a acknowledgement signal or no-acknowledgement signal or after establishing a no-response or CRC error condition.

18. A computer-readable recording medium on which a control program is recorded having computer-executable instructions for performing the method recited in claim 12.

19. A replaceable unit that receives data from a coupler board of a wireless identification system, the coupler board interfacing between the replaceable unit and a host processor of the wireless identification system, the replaceable unit comprising:
a replaceable unit monitor that generates a signal to the coupler board to affirmatively indicate the success or failure of data reception, the signal being an acknowledgement signal signifying success if the data reception is completed successfully, and a no-acknowledgement signal signifying failure if the data reception fails, wherein the replaceable unit monitor includes a radio frequency identification tag, and transmitting data from the coupler board to the radio frequency identification tag is via modulated radio frequency signal,
wherein receiving acknowledgement signal or no-acknowledgement signal comprises establishing a no-response condition if no signal is received from the replaceable unit monitor within a predetermined amount of time and changing a value of a register in a memory of the coupler board from a default value to an updated value to indicate the no response condition, the register being accessible by the host processor; and
the coupler board includes a timer and measure a delay time allowing the coupler board to switch from a transmitter mode to a receiver mode at least for the purpose of listening for a response from the radio frequency identification tag.

20. The replaceable unit of claim 19, wherein the replaceable unit monitor is a radio frequency identification tag.

21. The replaceable unit of claim 19, the acknowledgement or no-acknowledgement signal being a binary code.

22. The replaceable unit of claim 19, wherein the replaceable unit monitor validates the data reception with a cyclic redundancy check (CRC) value of a radio frequency communication sequence, the acknowledgement signal being generated by the replaceable unit monitor when the replaceable unit monitor validates the data reception with the CRC value, the no-acknowledgement signal being generated by the replaceable unit monitor when the replaceable unit monitor does not validate the data with the CRC value.

23. The replaceable unit of claim 19, the replaceable unit monitor generating the acknowledgement or no-acknowledgement signal with a protocol implemented in firmware or hardware in the coupler board and firmware or hardware in the replaceable unit monitor.

24. A wireless identification system for confirming completion of data transmission, comprising:
   the replaceable unit of claim 19;
   a host processor; and
   a coupler board that transmits data to the replaceable unit monitor, and receives the acknowledgement or no-acknowledgement signal from the replaceable unit monitor.

25. A marking device including the system of claim 24.

26. The marking device of claim 25, wherein the marking device is a digital photocopier.

27. The marking device of claim 25, wherein the marking device is a xerographic marking device.

* * * * *